(12) United States Patent
Zhang et al.

(10) Patent No.: US 12,414,031 B2
(45) Date of Patent: Sep. 9, 2025

(54) CENTRALIZED SOLUTION TO HIGH-THROUGHPUT TOPOLOGY OPTIMIZATION FOR WIRELESS MESH NETWORKS

(71) Applicant: HEWLETT PACKARD ENTERPRISE DEVELOPMENT LP, Houston, TX (US)

(72) Inventors: Xiong Zhang, Shanghai (CN); Xiaoyang Fu, Beijing (CN); Kangchang Huang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 617 days.

(21) Appl. No.: 17/828,371

(22) Filed: May 31, 2022

(65) Prior Publication Data

US 2023/0388896 A1    Nov. 30, 2023

(51) Int. Cl.
*H04W 40/24*   (2009.01)
*H04W 40/16*   (2009.01)

(52) U.S. Cl.
CPC ......... *H04W 40/248* (2013.01); *H04W 40/16* (2013.01); *H04W 40/246* (2013.01)

(58) Field of Classification Search
CPC .... H04W 40/248; H04W 40/16; H04W 40/24
See application file for complete search history.

(56) References Cited

U.S. PATENT DOCUMENTS 10,805,984 B2   10/2020   Iyer et al.
11,502,936 B2   11/2022   Zad Tootaghaj et al.
2011/0051619 A1* 3/2011  Gong .................... H04W 16/10
                                                    370/252
2019/0274084 A1* 9/2019  Daniels ................. H04W 40/12
2022/0159548 A1* 5/2022  Takeda .................. H04W 40/02

OTHER PUBLICATIONS

Cheng et al., "A study on distributed/centralized scheduling for wireless mesh network," 2006, Proceedings of the 2006 international conference on Wireless communications and mobile computing, pp. 599-604, <https://faculty.csie.ntust.edu.tw/~smcheng/papers/C03_0607_A%20Study%20on%20Distributed%20Centralized%20Scheduling%20for%20Wireless%20Mesh%20Network.pdf>.
Wikipedia, "Wireless mesh network," May 18, 2022, <https://en.wikipedia.org/w/index.php?title=Wireless_mesh_network&oldid=1088577673>.

* cited by examiner

*Primary Examiner* — Sun Jong Kim
(74) *Attorney, Agent, or Firm* — Sheppard Mullin Richter & Hampton LLP

(57) ABSTRACT

Systems and methods are provided for a computing system for managing a mesh network deployment that includes a memory storing machine-executable instructions, and a processor configured to access the memory and execute the machine executable instructions to receive, link performance measurements from a plurality of access points in a mesh network, and determining a topology of the mesh network by: determining a first node competition index (NCI) for each interfering access point of the plurality of access points in the mesh network; comparing the NCI for each interfering access point to determine a maximum transmission time for each mesh link; and altering the network topology by assigning an active or backup mesh link to each access point based on the maximum transmission time for each mesh link.

9 Claims, 10 Drawing Sheets

CENTRALIZED SOLUTION TO HIGH-THROUGHPUT TOPOLOGY OPTIMIZATION FOR WIRELESS MESH NETWORKS

BACKGROUND

A mesh network is a communication network comprising a plurality of access points (APs) each communicatively coupled to form a mesh topology. The plurality of APs include mesh APs, mesh points, and nodes. Typically, each AP establishes one active mesh link and several backup mesh links as candidate mesh links to transfer data between each AP of the mesh network. However, traditional mesh topology rely on each of the APs in the network without an ability to reorganize the communication paths. Better methods are needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
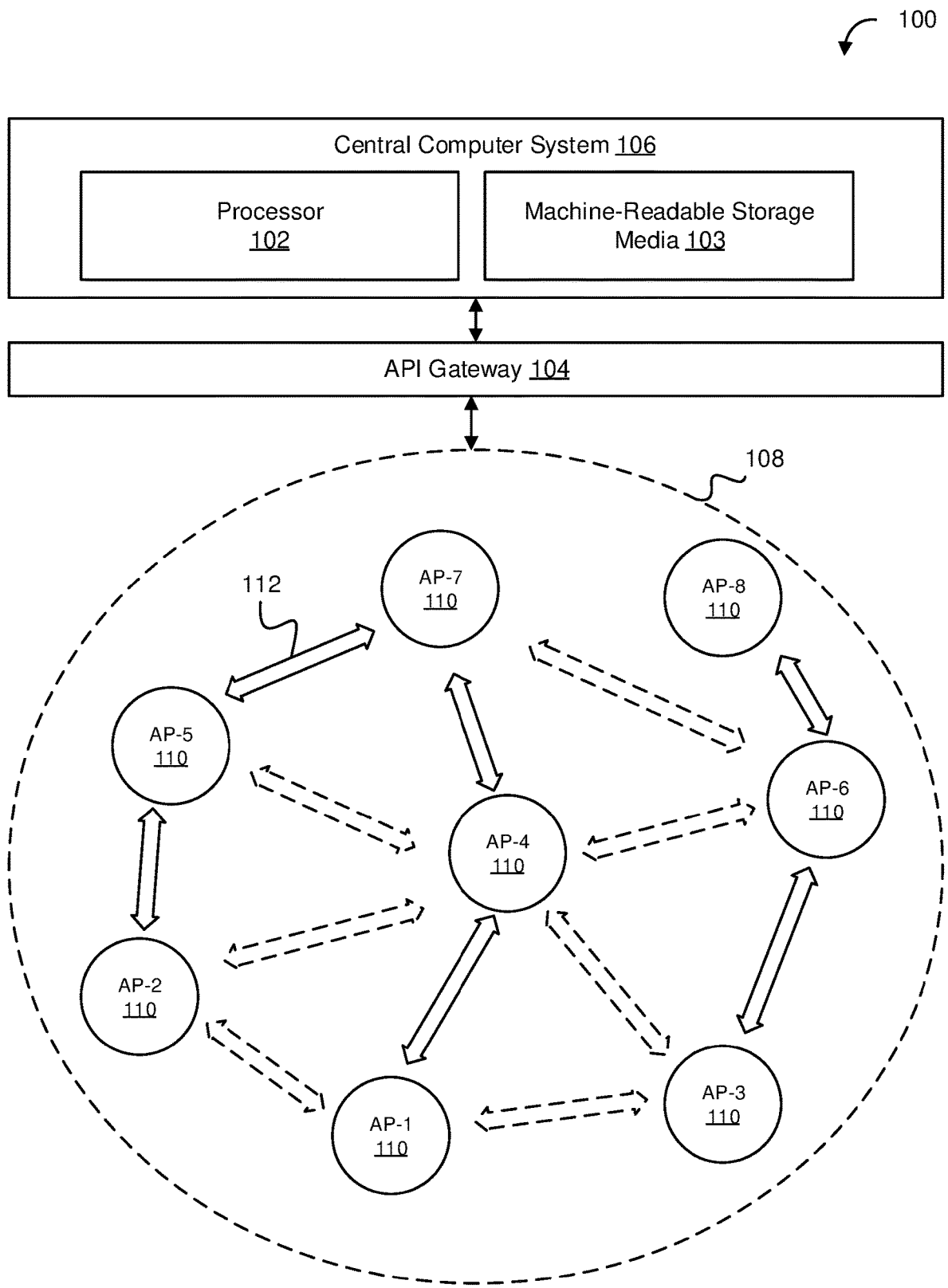
FIG. 1 is a diagram of an example wireless network according to embodiments of the present disclosure.

The figures are not exhaustive and do not limit the present disclosure to the precise form disclosed.

DETAILED DESCRIPTION

Wireless networks, including mesh networks, aim to provide reliable connectivity for user and high end-to-end throughput performance. Routing is one of the most important factors affecting connectivity and throughput in wireless networks, especially in multi-hop wireless mesh networks. Routing establishment depends on metric values associated with each routing path. The metric typically considers many comprehensive factors, such as hop count, delay time, and link capacity. For a wireless network, the hop count and the delay time are relatively easy to measure. However, the link capacity is complicated and difficult to measure because wireless link environments are often influenced heavily by interference.

Determining an accurate mesh link capacity is one of the largest problems preventing generating of an effective and efficient mesh network, at least because mesh link capacity decreases with increased channel interference. Traditional networks cannot quantitatively evaluate the effects of channel interference on the transmission time on each mesh link between access points. Therefore, there is a need for determining the effect of competing (i.e., interfering) access points on the capacity of each mesh link between APs in the mesh network. Once the effect of the interfering APs on the capacity of each mesh link is determined, the topology of the mesh network can be altered to change transmission times for mesh links in the adjusted mesh network.

Systems and methods to improve the generation and maintenance of wireless mesh networks is provided throughout the disclosure. For example, a central computer system may be in communication with one or more access points associated with a mesh network. The access points may be connected to each other through mesh links. The central computer system may remotely manage the topology of the mesh network by monitoring link data and tracking various metrics associated with the access points in the mesh network. The central computer system may initiate an adjustment of the topology based on these metrics. In some examples, the mesh network may comprise one or more access points, nodes, or other network devices. These terms may be used interchangeably without diverting from the essence of the disclosure.

In one example, the central computer system receives link performance metrics for each mesh link between two access points in the mesh network. The link performance metrics can include throughput values and clear channel assessment reports for each mesh link. The link performance metrics for each mesh link may be used as a baseline to determine the optimized transmission time for each mesh link.

Once the central computer system receives the link performance metrics for each mesh link, the central computer system can determine the influence value of each competing access point (i.e., interfering competing access point) to help identify which access points are affecting transmission values between two other access points. Each influence value may be determined by using a node competition index (NCI), which is a computation performed by the central computer system to quantitatively measure these link performance metrics and other data transmissions that can affect the transmission ability of some access points in the mesh network along each mesh link. For example, the node competition index may include a channel influence value (e.g., a value associated with the amount of interference from neighboring APs using the same channel, and channel utilization value (e.g., a value associated with how much channel use an access point is responsible for since high channel use typically results in channel congestion and slower transmission rates), as described throughout the disclosure.

The node competition index for each link may be used by the central computer system to determine an optimized transmission time M for one or more mesh network topologies. Each mesh network includes a unique network topology. Thus, once the central computer system determines the optimized transmission time M for each topology, the central computer system can determine the best topology for optimizing the transmission time M for the mesh network.

FIG. 1, is a diagram of an example wireless network according to embodiments of the present disclosure. The wireless network 100 includes a mesh network 108 comprising a plurality of access points 110, an API gateway 104, and a central computer system 106. The central computer system 106 includes a processor 102, and a machine-readable storage media 103 that includes a set of executable instructions that, when executed, cause an illustrative method to be performed for effectively evaluating network capacity and adjusting the mesh topology of mesh network 108, according to one embodiment.

Figure 10:
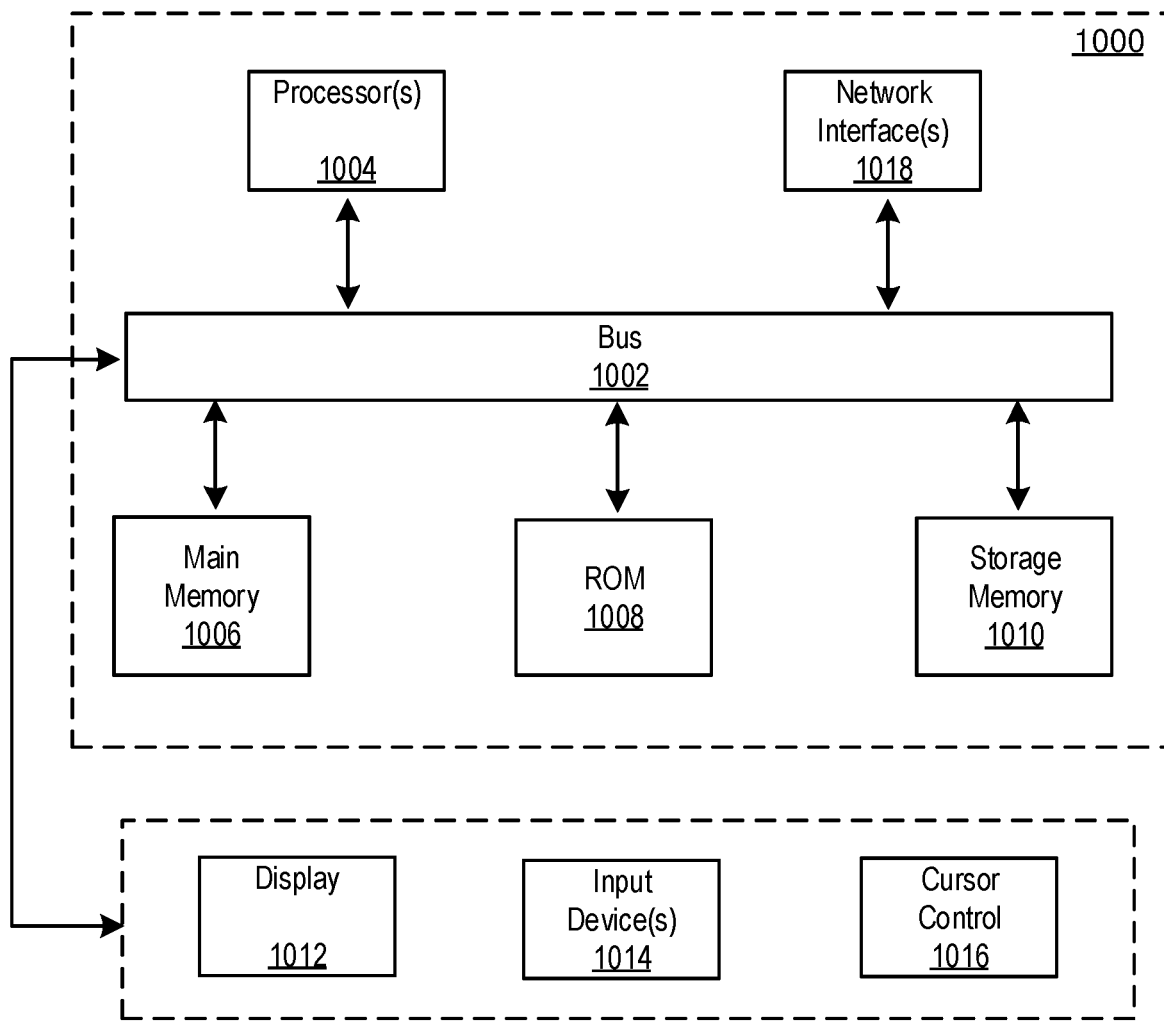
FIG. 10 is an example computing component that may be used to implement various features of embodiments described in the present disclosure.

Central computer system 106 includes a machine-readable storage media 103, which can include a main memory as illustrated in FIG. 10, and one or more processors 102, each of which can include one or more processing units or cores. The one or more processors 102 may be configured to execute computer-executable code/instructions of various engines to cause input data contained in or references by the computer-executable program code/instructions to be accessed and processed by the processing unit(s)/core(s) to yield output data.

Central computer system 106 may comprise engines, program modules, or other components to perform operations described herein in accordance with the machine-readable instructions. It should be appreciated that any description herein of an engine performing a function inherently encompasses the function being performed responsive to computer-executable/machine-executable instructions of the engine being executed by a processor. In some embodiments, the executable instructions stored on the machine-readable storage media may be modularized into one or more computing engines/program modules. In particular, each such computing engine may include a set of machine-readable and machine-executable instructions, that when executed by a hardware processor, causes the hardware processor to perform corresponding tasks/processing. In some embodiments, the set of tasks performed responsive to execution of the set of instructions forming a particular computing engine may be a set of specialized/customized tasks for effectuating a particular type/scope of processing. The aforementioned engines/program modules can be implemented in any combination of hardware, software, and/or firmware. In some embodiments, these engines may be customized computer-executable logic implemented within a customized computing machine such as a customized field programmable gate array (FPGA) or an application specific integrated circuit (ASIC).

In one embodiment, the central computer system 106 includes a cloud system, which may be, for example, a collection of cloud servers (e.g., a server cluster) connected to the mesh network 108 through an API gateway 104. As used herein, the terms "cloud and "cloud-based," or variants thereof, generally refer to a computing environment/system that includes a collection of computing devices (e.g., cloud servers) configured to provide services (e.g., computing services, storage services, etc.) to one or more devices physically located remotely from the cloud environment/system. In some examples, the "central" of central computer system 106 may refer to a virtual or physical computing device that is located separately from each of the access points in mesh network 108.

API gateway 104 may comprise a management tool that sits between a client and a variety of backend services. The API gateways 104 acts as a reverse proxy to accept all API calls, aggregate the various services required to fulfil them and return the appropriate results. For example, in one embodiment, the API gateway 104 connects the central computer 106 to the mesh network 108.

The mesh network 108 includes a collection of access points AP1-AP8 110. For example, each access point AP1-AP8 110 may correspond with a network device that allows other network devices (e.g., client or user devices) to connect wirelessly to a backend wired network. The access point 110 may have a wired connection to a router or may operate as a wireless router independently. Other types of network devices may create the mesh network 108 without diverting from the essence of the disclosure.

In one embodiment, the mesh network 108 corresponds with a wireless local area network (WLAN) that includes wireless access points AP1-AP8 110. Each access point AP1-AP8 110 can communicate with other access points AP1-AP8 110 via one or more a mesh links 112 in which to transmit management or data frames. Each mesh link 112 may be established with another access point AP1-AP8 110 when a first access point initiates a scanning process of channels in its provisioned band of operation. The scanning process may help identify a list of neighboring access points AP1-AP8 110 that match its mesh cluster profile. The access point AP1-AP8 110 may then select the highest priority neighbors in terms of one or more network parameters (e.g., least expected path cost) with which to establish mesh links 112 and form a mesh network 108.

As seen further in FIG. 1, each access point 110 has one active mesh link 112 and several backup mesh links 112. For example, AP-1 has an active mesh link 112 to AP-4, and has a backup mesh link 112 to AP-3 and AP-2. During a typical bootstrapping stage (e.g., connecting an access point to a wireless mesh network), an access point establishes its mesh links 112 to neighbors based on the received signal strength indicator(s) (RSSI). For example, AP-1 sets an active mesh link 112 to AP-4 since AP-4 has the highest RSSI value when compared to other measured RSI values with the access point neighbors. As a precaution, AP-1 will maintain a backup mesh link 112 with AP-2 and AP-3. For each access point, the central computer system 106 can determine one link to be the active mesh link, and the rest backup mesh links, thus forming a new topology for the overall network.

Figure 2:
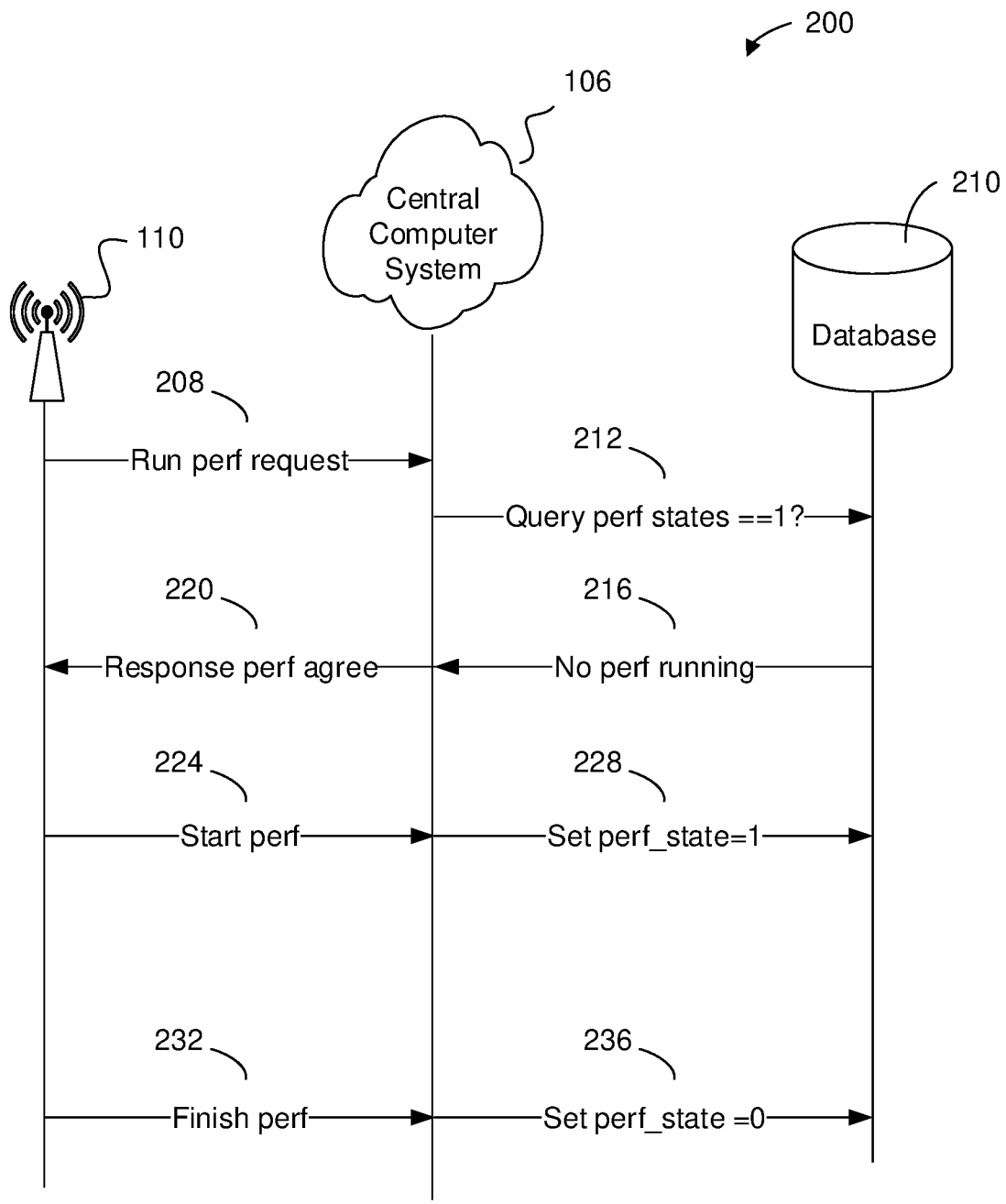
FIG. 2 is a schematic of a throughput test process, according to one embodiment.

FIG. 2 is an example schematic of a throughput test process, in accordance with some embodiments described herein. The throughput test process may determine which throughput tests are used to measure the maximum transmission capacity of each link. The throughput test process may be initiated by central computer system 106 illustrated in FIG. 1. For example, central computer system 106 receives transmission link measurements from each AP 110 via API gateway 104, as illustrated in FIG. 1, and may initiate the throughput test process at one or more APs 110.

Central computer system 106 uses the transmission link measurements to determine baseline values for each mesh link 112. The transmission link measurements include clear channel assessment (CCA) reports and throughput tests for each link. The CCA reports include metrics on channel utilization and interference.

Specifically, each access point 110 monitors the current channel state during bootstrapping and creates a CCA report that includes one or more items in table 1 below:

TABLE 1

CCA measurement items

| Items (%) | Description |
|---|---|
| Tx percentage | Transmitting time duration percentage |
| Rx percentage in BSS | Receiving time duration percentage in BSS |
| Rx percentage out of BSS | Receiving time duration percentage for frames out of BSS |
| Other | Power saving time, decoding error, etc. |

Since there is no large traffic on each mesh link 112 during bootstrapping, the CCA reports can be used by the central computer system 106 as baseline information.

During the throughput test process, the central computer system 106 receives throughput test results for each link. However, to accurately measure the maximum throughput of each mesh link. Based on this information, central computer system 106 may receive, create and execute a series of instructions between each access point AP1-AP8 110 and the database 210. Thus, to prevent multiple APs 110 from running throughput tests at the same time, the central computer system 106 authenticates each AP (e.g., the central computer system 106 compares the IP address of the AP 110 with a list of approved IP addresses) throughput request to determine whether an individual throughput test is available. Once the AP is vetted, central computer system 106 may transmit an acknowledgement message to the AP that confirms that no other APs are running a throughput test. Upon receiving the acknowledgement message, AP can initiate its portion of the throughput test process when not other AP is currently running a similar throughput test. The request for a test by AP-1 may be rejected by the central computer system 106 if there are other running throughput tests.

As an illustrative example, AP-1 110 sends a request message 208 to start its portion of the throughput test process (e.g., "run perf request") to the central computer system 106. The central computer system 106 sends a query message 212 to database 210 (e.g., "query perf states==1?"). This query message may help determine whether any test is running. If the central computer system 106 receives confirmation message 216 that no throughput test is running (e.g., "no perf running"). Central computer system 106 may transmit instruction message 220 to AP 110 to start a throughput test. Alternatively, the central computer system 106 can query the database 210 first, by directly sending a perf command to the AP if the database 210 is empty. Once the AP 110 is ready to start the test, AP 110 may send an instruction message 224 (e.g., "start perf") to the central computer system 106. Central computer system 106 may send an instruction message 228 to database 210 (e.g., "set perf_state=1"). Once the throughput test is done, AP 110 may transmit a completion message 232 to central computer system 106 (e.g., "finish perf"), and the central computer system 106 sends an instruction message 236 to database 210 (e.g., "set perf_state=0") that the throughput test has completed, so that another throughput test can begin on a different AP. When central computer system 106 checks the database 210, the database may again identify that no throughput test process is running.

Figure 3:
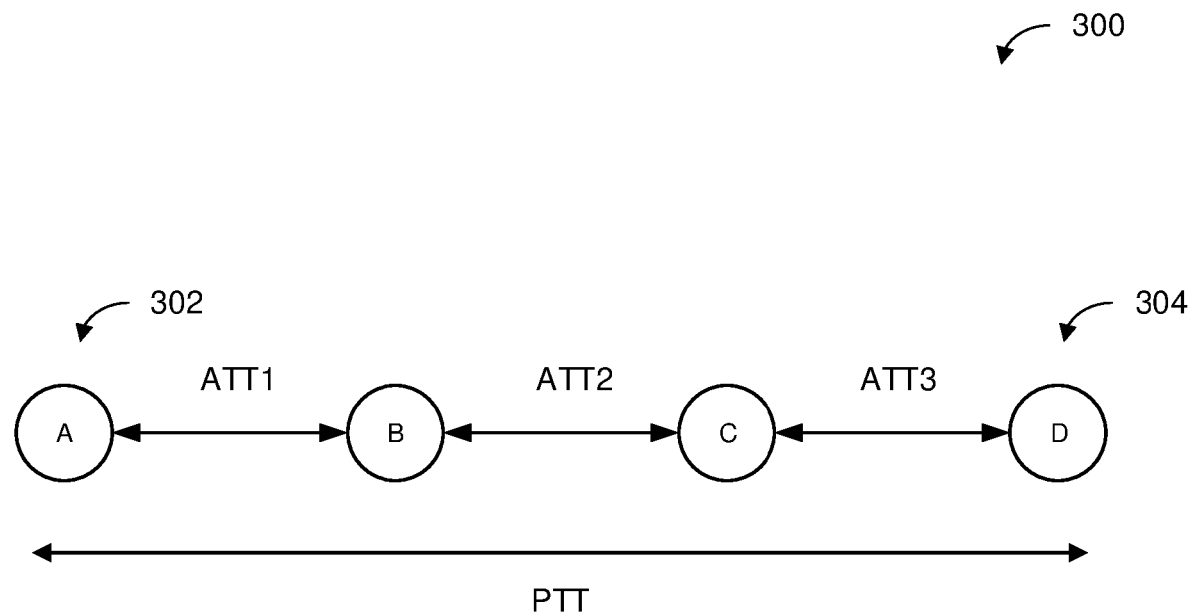
FIG. 3 is an illustration of a path transmission time (PTT) on a multi-hop path, according to one embodiment.

FIG. 3 illustrates a transmission time on a multi-hop path 300, according to one embodiment. FIG. 3 includes access points A-D, the transmission time (TT) TT1-TT3 between each access point A-B, B-C, C-D, and a path transmission time (PTT) for the entire multi-hop path 300. TT1 includes the transmission time between access point A and access point B. TT2 includes the transmission time between access point B, and access point C. TT3 includes the transmission time between access point C, and access point D. The PPT includes the sum of TT1, TT2, and TT3.

Here, the transmission time of each link (i.e., hop) is determined by the maximum throughput between each access point A-D. The maximum throughput between each access point A-D is measured during the throughput test process. For example, Table 2 lists the result of a bi-directional throughput test process between access point A and access point B where $T_A$ is the maximum throughput of access point A to access point B, and $T_B$ is the maximum throughput of access point B to access point A.

TABLE 2

| | throughput test result |
|---|---|
| Direction | Maximum Throughput (Mbps) |
| A -> B | $T_A$ |
| B -> A | $T_B$ |

In one embodiment, the transmission time of each link is determined by combining packet size and throughput. For example, in one embodiment, the TT between access point A and access point B is calculated according to the following:

$$TT1 = \frac{1}{2}\left(\frac{S}{T_A} + \frac{S}{T_B}\right)$$

Here, S is the packet size used in the throughput test process. In one embodiment S is a fixed value. The sum of the transmission time between each link of a multi-hop path (e.g., TT1+TT2+TT3), determines a path transmission time (PTT) for the multi-hop path 300. For example, the PPT from a source access point A 302 to a destination access point D 304 is calculated according to the following:

$PTT=TT1+TT2+TT3$

Figure 4:
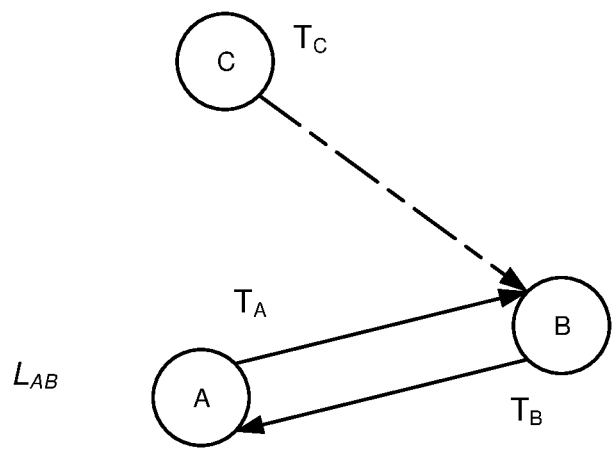
FIG. 4 is an illustration of transmission competition at an access point on a mesh link, according to one embodiment.

FIG. 4. is an illustration of transmission competition at a node on a mesh link, according to one embodiment. FIG. 4 includes access point A, access point B and an interfering access point C (e.g., a neighboring access point that interferes in the link between access point A and access point B). Here, when access point A transmits traffic $T_A$ to access point B, it encounters interference from access point C conveying traffic $T_C$ to access point A. Facing media access competition from access point C, the maximum throughput value from access point A to access point B will decrease, thus increasing the transmission time of the link between access point A and access point B.

To determine the amount of interference of an interfering access point (e.g., access point C) on a link, the central computer system 106 uses a node competition index (NCI) to represent the effect of the access point interference on the link. Thus, by using the NCI, the central computer system 106 can determine the actual link capacity under realistic interference.

Figure 5:
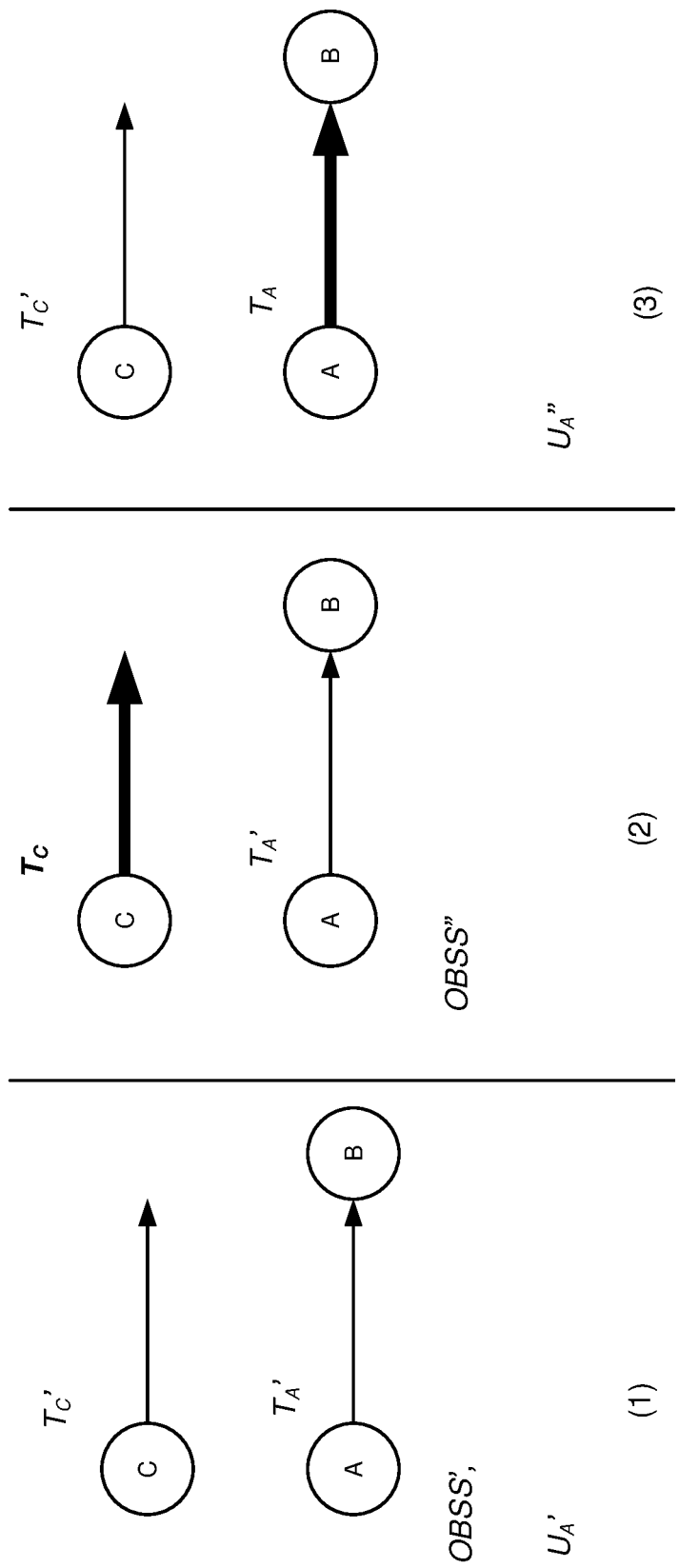
FIG. 5 is an illustration of the node competition index of access point APX on access point AP2, according to one embodiment.

FIG. 5 is an illustration of the NCI of interfering access point C on access point B, according to one embodiment. For multiple nodes that are simultaneously sending traffic, the central computer system 106 quantitatively evaluates the ability of the interfering access point (e.g., interfering access point C) to compete for media access with the target access point (e.g., access point B), represented by the NCI. As a node-to-node point index to indicate competition ability, the NCI is calculated by comparing the maximum change value of channel usage between the additional interfering access point (e.g., access point C) and the affected target node (e.g., access point B).

Specifically, FIG. 5 includes a schematic illustration of a multi-staged test process implemented by the central computer system 106 to determine the node competition index NCI of interfering access point C on target access point B, according to one embodiment. FIG. 5 includes, a first stage 501, a second stage 502, a third stage 503, access point A, access point B, interfering access point C, traffic $T_A$, traffic $T_C$, a first channel utilization $U_A'$ of the link between access point A and access point B, a second channel utilization $U_A''$ of the link between access point A and access point B, a first channel interference percentage OBSS' of the link between access point A and access point B, and a second channel interference percentage OBSS" of the link between access point A and access point B.

Here, the first stage 501 includes an idle state where channel utilization value $U_A$ of the link between access point A, and access point B is $U_A'$ and its channel interference value OBSS of the link between access point A, and access point B is OBSS'. The $U_A'$ and OBSS' values are gathered by the central computer system 106 and stored in memory (e.g., the machine-readable storage media 104) as baseline values. At the second stage 502, the central computer system 106 initiates a throughput test process by sending maximum traffic through access point C. While the access point C is running maximum traffic, the computer system 106 monitors the channel interference value OBSS between access point A and access point B, and stores the observed OBSS value under the influence of access point C as OBSS" in memory (e.g., the machine-readable storage media 104). At the third stage 503, the central computer system 106 initiates a throughput test process by sending maximum traffic from access point A to access point B. The computer system 106 monitors the channel utilization $U_A'$ of the link between access point A and access point B, and stores the value of $U_A''$ of the channel under maximum traffic between access point A and access point B.

Figure 6:
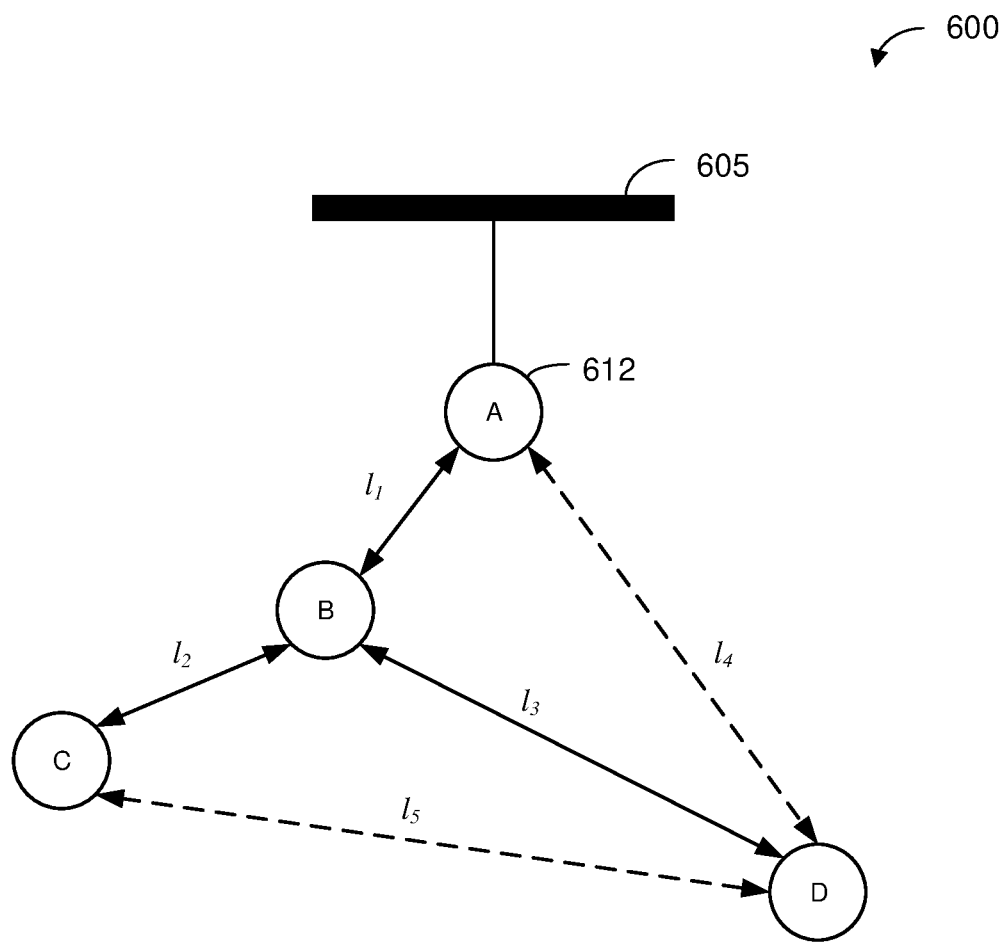
FIG. 6 is a schematic illustration of a tree topology of a mesh network, according to one embodiment.

Thus, for multiple access points that are simultaneously sending traffic (e.g., access point A to access point B), the central computer system 106 quantitatively evaluates the ability of the interfering access point C to compete for media access with the target access point B, represented by the NCI. As seen in FIG. 6, the NCI of interfering access point C on access point B is the ratio of the change value of channel interference brought by interfering access point C, and the change value of channel utilization gained by the affected access point B. Thus, the centralized control strategy ensures that the maximum value change of both interference and utilization are separately recorded.

Here, the access point competition index (NCI) of interfering access point C on access point A is calculated according to the following:

$$NCI(C, A) = \frac{\Delta OBSS_C}{\Delta U_A}$$

Where the $\Delta OBSS_C$ is the maximum change value of channel interference brought by access point C and is calculated according to the following:

$$\Delta OBSS_C = OBSS'' - OBSS'$$

Where $\Delta U_A$ represents the change of channel utilization gained by access point A, and is calculated according to the following:

$$\Delta U_A = U_A'' - U_A'$$

Using this process, the NCI between any two nodes in the network can be derived based on the measurement results in the network measurement stage. The maximum transmitted throughput T of a access point is related to its available channel utilization U. Thus, the NCI can be used to represent a ratio of available channel usage. For example, the actual channel usage $U_A'$ can be calculated according to the following:

$$U_A' = U_A \times \frac{1}{1 + NCI(C, A)}$$

Where $U_A$ is the original available channel utilization of access point A without interference. Furthermore, the actual maximum throughput $T_A'$ from access point A to access point B can be calculated according to the following:

$$T_A' = T_A \times \frac{1}{1 + NCI(C, A)}$$

Where $T_A$ is the original maximum throughput from access point A. Thus, the transmission time (TT) of link $L_{AB}$ under competition of the interfering access point C can be determined by using the access point competition index (NCI) of the interfering access point C on target access point A and the access point competition index (NCI) of interfering access point C on access point B. For example, the TT of link $L_{AB}$ under competition of the interfering access point C can be can be calculated according to the following:

$$TT' = \frac{1}{2}\left(\frac{S}{T_A'} + \frac{S}{T_B'}\right) = \frac{S}{2}\left(\frac{1}{T_A} \times (1 + NCI(C, A)) + \frac{1}{T_B} \times (1 + NCI(C, B))\right)$$

Where $T'_A$ is the original maximum throughput from access point A, $T'_B$ is the original maximum throughput from access point B, $U'_A$ is the actual channel usage of access point A, and $U'_B$ is the actual channel usage of access point B. Furthermore, channel usage reduction of affected access point A can also be represented using NCI of multiple interfering nodes $N_1, N_2, \ldots N_n$. For example, the channel usage reduction of affected access point A with multiple interfering nodes can be calculated according to the following:

$$U_A' = U_A \times \frac{1}{1 + NCI(N_1, A) + NCI(N_2, A) + \ldots + NCI(N_n, A)} = U_A \times \frac{1}{1 + \Sigma_{i=0}^n NCI(N_i, A)}$$

By combining the channel usage reduction of affected access point A due to multiple nodes, with the channel usage reduction of affected access point B due to multiple interfering nodes, the system can determine the TT of link $I_{AB}$ under interference of multiple nodes $N_1, N_2, \ldots N_n$. For example, the TT of link $I_{AB}$ can be calculated according to the following:

$$TT_I = \frac{S}{2}\left(\frac{1}{T_A} \times (1 + \sum_{i=0}^n NCI(N_i, A)) + \frac{1}{T_B} \times (1 + \sum_{i=0}^n NCI(N_i, B))\right)$$

Thus, the TT of each candidate link in a realistic RF environment can be calculated using the NCI between each node.

FIG. 6 is an example of a mesh topology according to one embodiment. Here, the mesh network include a tree topology 600. The tree topology 600 includes a plurality of mesh backhaul links (I) that form a backbone network. The mesh backhaul links (I) convey the users' data to the backbone network. The wireless mesh backhaul links include a plurality of access points APs and a root access point 612 which is connected to the backbone network via a wired uplink 605. In this example, access point A is the root access point 612 that is connected to the backbone network with the wired uplink. Furthermore, in the tree topology, each access point AP has one fixed path to the root access point 612. As previously shown in FIG. 3, the fixed path can include one or more links. The total time for data to pass from the source access point to the root access point 612 along a fixed path is the path transmission time (PTT) which is determined by the sum of the transmission time of each link in the mult-hop path.

As shown, FIG. 6 includes a plurality of active links $I_1$, $I_2$, $I_3$, and a plurality of backup links $I_4$ and $I_5$. The active links $I_1$, $I_2$, $I_3$ form the tree topology 600 and convey data, while $I_4$ and $I_5$ are backup links. In this example, access point D (e.g., source access point) forms an active link to the root access point 612 (i.e., access point A) through access point B. Thus, the multi-hop path from access point D to the root node includes the link $I_3$ between access point D and access point B, and the link $I_1$ between access point B and access point A. Each link $I_1$ and $I_3$ includes a transmission time. The path transmission time (PTT) of the active link of access point D to root access point 612 (i.e., access point A) is the sum of the transmission times of $I_1$ and $I_3$. The multi-hop path from access point C (e.g., source access point) to the root access point 612 (i.e., access point A) includes the link $I_2$ between access point C and access point B, and the link $I_1$ between access point B and root access point 612 (i.e., access point A). Each link $I_1$ and $I_2$ includes a transmission time. The path transmission time (PTT) of the active link of access point C to access point A is the sum of the transmission times of $I_1$ and $I_2$. Furthermore, the multi-hop path from access point B (e.g., source access point) to the root node includes the link $I_1$, which includes a transmission time, and PTT from access point B to the root access point 612 (i.e., access point A). By determining the sum of the transmission times of each link, the central computer system 106 can determine the path transmission time (PTT) of the tree topology 600. By comparing the PTT of each tree topology, the central computer system 106 can determine a maximum PTT of each tree topology 600.

Furthermore, in one embodiment, the central computer system 106 can determine the maximum transmission time M of the mesh network. In this example, the mesh network includes the tree topology 600. However, the mesh network can include a plurality of trees each with a plurality of tree topologies 600. Here, the maximum transmission time M of the network can be calculated according to the following:

$$M = PTT_B + PTT_C + PTT_D$$

Where $PTT_B$, $PTT_C$, and $PPT_D$ can be calculated according to the following:

$$PTT_B = ATT_{I_1} (B \leftrightarrow A)$$

$$PTT_C = ATT_{I_1} + ATT_{I_2} (C \leftrightarrow B \leftrightarrow A)$$

$$PTT_D = ATT_{I_1} + ATT_{I_3} (D \leftrightarrow B \leftrightarrow A)$$

In a multi-hop network the PTT of each access point $N_i$ is the sum of TTs of each hop $I_1, I_2, \ldots I_j$ on its path $P_i$ to root node. The $PTT_i$ of each access point $N_i$ can be calculated according to the following:

$$PTT_i = \sum_{I_j \in P_i} ATT_{I_j}$$

Thus, the total metric of the of the mesh tree is the sum of the PTT of each node, which can be calculated according to the following:

$$M = \sum_{i=0}^{n} PTT_i$$

Where M can be re-written as a general equation according to the following:

$$M = \sum_{i=0}^{n} PTT_i = \sum_{i=0}^{n} \sum_{I_j \in P_i} ATT_{I_j} =$$

$$\frac{S}{2} \sum_{i=0}^{n} \sum_{I_j \in P_i} \left( \frac{1}{T_{N_{j1}}} \times (1 + \sum_{\substack{i=0, \\ i \neq j1}}^{n} NCI(N_i, N_{j1})) + \frac{1}{T_{N_{j2}}} \times (1 + \sum_{\substack{i=0, \\ i \neq j2}}^{n} NCI(N_i, N_{j2})) \right)$$

Where $P_i$ is the path of access point $N_i$ to the root node, and is a hop on path and $P_i$, $N_{j1}$, and $N_{j2}$ are two endpoints of link $I_j$. In one embodiment, the central computer system 106 uses an incremental strategy to search each link, in each tree, node-by-node point to determine the optimized transmission time M of the network.

Figure 7:
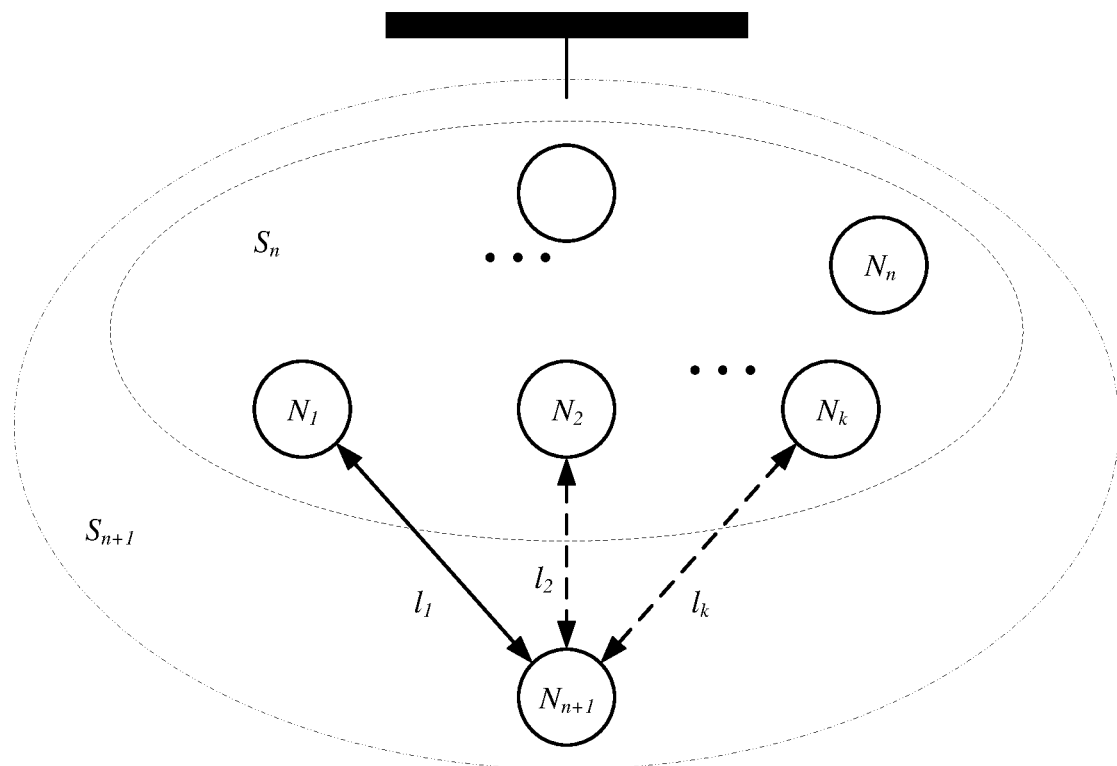
FIG. 7 is an illustration of a new node into a N-node subnetwork $S_n$.

FIG. 7 is a schematic illustration of a method of adding a new access point into a N-access point subnetwork $S_n$. In one embodiment, the central computer system 106 searches through the network topology for combinations of links with new access points to optimize the transmission time of each tree in the mesh network. Optimizing the transmission time of each tree includes increasing/decreasing the maximum transmission time, maximizing/minimizing throughput, minimizing interference, and other forms of increasing the efficacy of signal transmission. In one embodiment, optimizing includes balancing the network to achieve an ideal throughput and network capacity for all access points.

In this illustration, FIG. 7 includes a sub-network $S_n$ having nodes (i.e., access points) $N_1, N_2, \ldots N_n$ within. A new access point $N_{n+1}$ is out of the subnetwork, and has maintained an active link $I_1$ and several backup links from $I_2$ to $I_k$. When adding the new access point to $S_n$ to form a new n+1 nodes network the $S_{n+1}$, topology of the nodes inside $S_n$ is fixed and cannot be changed. Only one of the candidate links from $I_1$ to $I_k$ will become the active link, and metrics of $S_{n+1}$ can be calculated according to the topology formed by this link. The central computer system 106 selects one link as the active link which makes the metrics of $S_{n+1}$ minimized among the k cases.

In one embodiment, the central computer system chooses an access point from its neighbor which has a new link with the root node, and forms an optimized 2-access point sub-network 52 with minimized metrics inside. Using the process above, the topology of $S_3, S_4, \ldots S_k$, and n-access point network $S_n$ are gradually optimized node-by-node.

Figure 8:
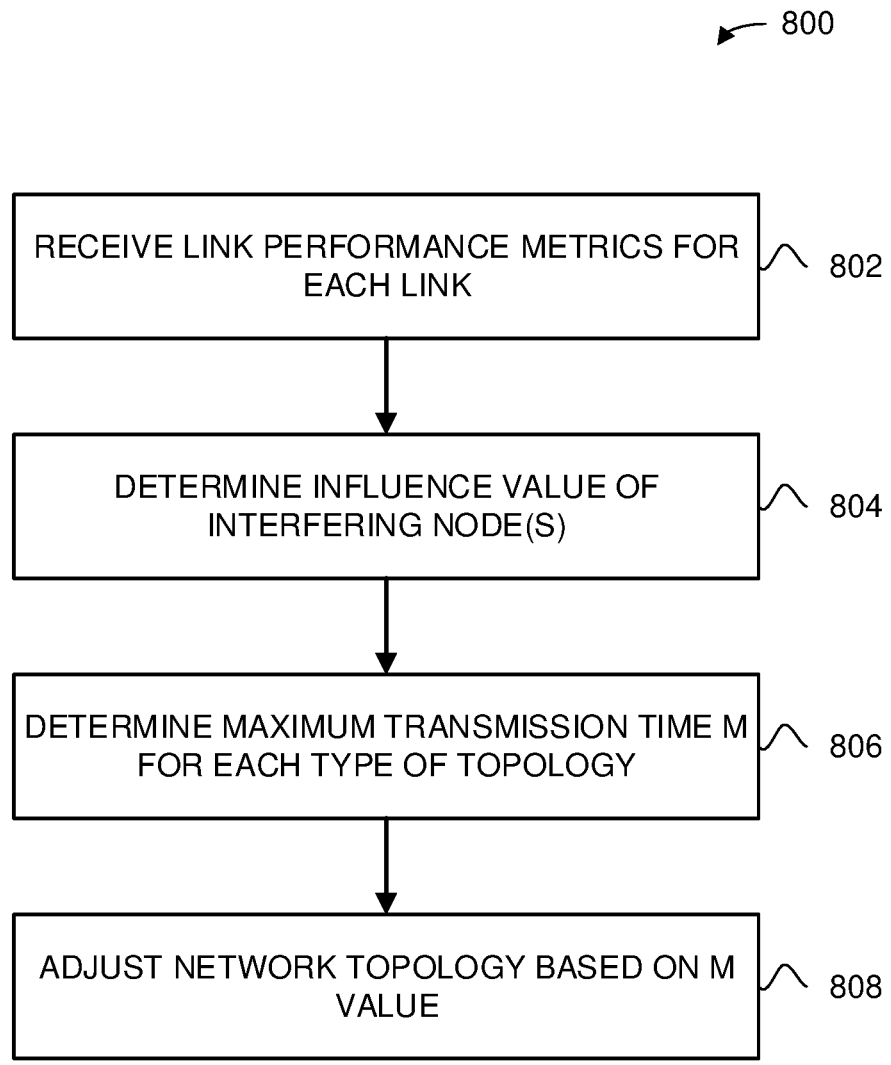
FIG. 8 is a method of altering the mesh network topology, according to one embodiment.

FIG. 8 is an illustration of a method of adjusting the network topology, according to one embodiment. The method 800 includes receiving link performance metrics for each link, determining an influence value of each interfering node, determining a optimized transmission time for each type of topology, and adjusting the network topology based on the optimized transmission time.

At activity 802, the method 800 includes receiving link performance metrics for each link. Here, the central computer system 106 receives link performance metrics. The link performance metrics include the clear channel assessment (CCA) report from each access point and throughput test results for each link. In one embodiment, the central computer system 106 receives the clear channel assessment (CCA) reports sent by each access point and conducts the throughput test (as shown in FIG. 2) for each link to determine the maximum throughput of each link in the network. In one embodiment, the central computer system 106 uses the throughput values and CCA reports to establish baseline values for each link. The baseline throughput value for each link is used in downline processes to determine the optimized transmission time M for each link.

At activity 804, the method 800 includes determining an influence value of the interfering node. The influence value includes the node competition index (NCI). Here, the central computer system gathers the transmission time of a link, under the influence of an interfering access point, to determine the NCI. Specifically, the central computer system quantitatively evaluates the ability of an interfering access point to compete for media access with a target access point in a link. For example, as seen in FIG. 4, the ability of an interfering access point C to compete for media access with the target access point A is represented by the node competition index (NCI). The NCI is calculated by comparing the maximum change value of channel usage between the additional interfering access point and the affected target node. For example, as seen in FIG. 5, the NCI of access point C on access point B is the ratio of change value of channel interference brought by the interfering access point C, and the change value of channel utilization between access point A and access point B. With the NCI of each access point determined, the capacity on each candidate link in a realistic RF environment can be calculated.

At activity 806, the method 800 includes determining the optimized transmission time M for each type of topology. Here, the central computer system 106 uses the NCI of each interfering access point to determine the transmission time of each link under the influence of each interfering access point. The sum of the transmission time of each link under the influence of each interfering access point is used by the central computer system 106 to determine the path transmission time (PPT) for each tree (which includes a plurality of links). The PPT values for each tree can be added together to determine the optimized transmission time M for the network topology. For example, the PPT for each tree in the network topology is added together to determine the optimized transmission time M for the topology. As trees are altered, each topology will have its own optimized transmission time M. For example, each time a tree is altered, the tree will have a new PPT and the network topology will have a new optimized transmission time M.

At activity 810, the method 800 includes adjusting the network topology based on the optimized transmission time M. Here, the central computer system 106, adjusts the network topology based on the optimized transmission time M. Once the central computer system 106 determines the network topology with the optimized transmission time M, the central computer system 106 sends link adjustment instructions to each access point to switch the topology of the active links so that the network topology achieves a optimized transmission time M. Accordingly, the central computer system 106 alters the active and backup links to form a network topology that includes the optimized transmission time M. Furthermore, the optimized transmission time M can be any value capable of distinguishing a peak value (for example, a minimum value in some configurations).

Figure 9:
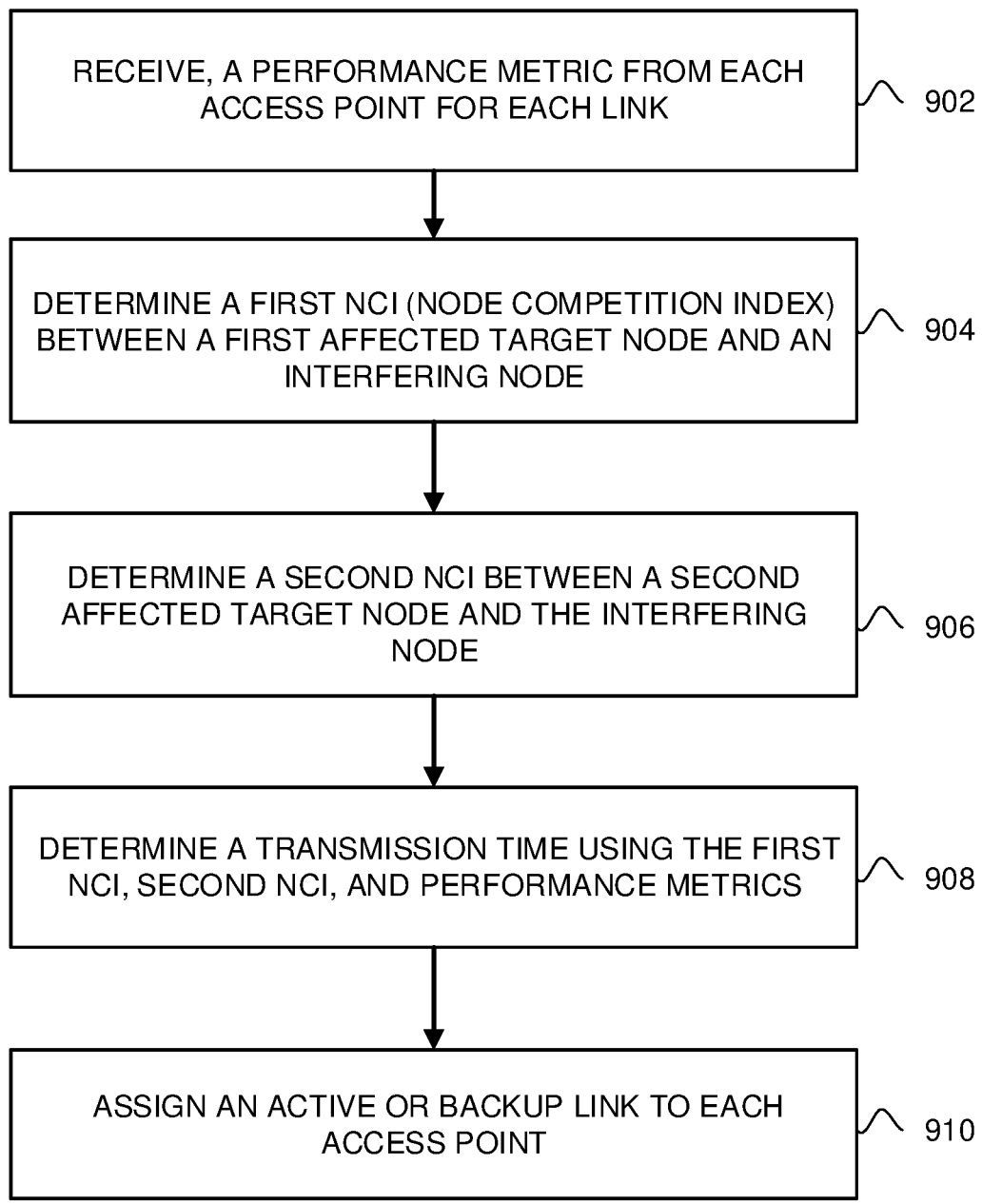
FIG. 9 is a method of altering the mesh network topology, according to one embodiment.

FIG. 9 is an illustration of a method of adjusting the network topology, according to one embodiment. The method 900 includes receiving, a performance metric from each access point for each link, determining a first NCI (node competition index) between a first affected target node and an interfering node, determining a second NCI between a second affected target node and the interfering node, determining a transmission time using the first NCI, second NCI, and maximum throughput, and assigning an active or backup link to each access point.

At activity 902, the method 900 includes receiving a performance metric from each access point for each link. Here, the central computer system 106 receives link performance metrics for each link. The link performance metrics include throughput tests for each link, an CCAs for each access point. By measuring the throughput of each link and receiving CCA reports, the central computer system 106 can determine a baseline throughput value for each link. The baseline throughput value for each link is used in downline processes to determine the optimized transmission time M for each link.

At activity 904, the method 900 includes determining a first NCI between a target access point and an first interfering access point. Here, the central computer system 106 uses the transmission time of a link under the influence of the first interfering access point as a metric to determine the NCI. Specifically, the central computer system quantitatively evaluates the ability of the first interfering access point to compete for media access with the target access point. In one embodiment, the NCI is calculated by comparing the maximum change value of channel interference and usage between the first interfering access point and the target access point.

At activity 906, the method 900 includes determining a second NCI between the target access point and a second interfering access point. Here, the central computer system 106 uses the transmission time of a link under the influence of the second interfering access point as a metric to determine the NCI. Specifically, the central computer system quantitatively evaluates the ability of the second interfering access point to compete for media access with the target access point. In one embodiment, the NCI is calculated by comparing the maximum change value of channel interference and usage between the second interfering access point and the target access point.

At activity 908, the method 900 includes determining a transmission time using the first NCI, second NCI, and the performance metrics. Here, the central computer system 106 uses the NCI of each interfering access point to determine the transmission time of each link under the influence of each interfering access point. The sum of the transmission time of each link under the influence of each interfering access point is used by the central computer system 106 to determine the path transmission time (PPT) for each tree. The PPT for each tree in the topology is summed to determine the optimized transmission time M for the topology. As trees are altered, each topology will have its own optimized transmission time M. For example, when a tree is altered in a topology the new tree will have a new PPT and the topology will have a new optimized transmission time M.

At activity 910, the method 900 includes determining an active or backup link to each access point. Here, the central computer system 106 alters the active and backup links to form a network topology that includes the optimized transmission time M. Once the central computer system 106 determines the network topology with the optimized transmission time M, the central computer system 106 sends link adjustment instructions to each access point to alter the topology of the active links so that the network topology achieves an optimized transmission time M.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing system for managing mesh network deployment, comprising:
    a memory storing machine-executable instructions; and
    a processor configured to access the memory and execute the machine-executable instructions to:
    receive link performance measurements from a plurality of access points in a mesh network, wherein a subset of the plurality of access points includes one or more access points not part of a mesh network, and wherein the mesh network is defined by the plurality of access points; and
    determine a topology of the mesh network by:
       determining a first node competition index (NCI) between a target access point and a first interfering access point of the plurality of access points, wherein the first NCI includes a first channel interference value of the first interfering access point and a first channel utilization value of the target access point;
       determining a second node competition index (NCI) between the target access point and a second interfering access point of the plurality of access points, wherein the second NCI includes a second channel interference value of the second interfering access point and a second channel utilization value of the target access point;
    comparing the first NCI and the second NCI with each other to determine a maximum transmission time of the mesh network; and
    altering the topology of the mesh network by assigning an active or backup mesh link of the mesh network to each access point of the plurality of access points based on the maximum transmission time.

2. The computing system of claim 1, wherein the processor is further to:
initiate a throughput test process that generates a throughput for each access point of the plurality of access points in determining the first and second channel interference values.

3. The computing system of claim 1, wherein the first and second channel interference values each include a maximum change value of channel interference and a maximum change value of channel utilization.

4. The computing system of claim 1, wherein the link performance measurements include one or more throughput values.

5. The computing system of claim 1, further comprising:
determining a first transmission time (TT) for a first mesh link of the mesh network, that includes the first NCI between the target access point and the first interfering access point; and
determining a second transmission time (TT) for a second mesh link of the mesh network, that includes the second NCI between the target access point and the second interfering access point.

6. The computing system of claim 5, further comprising:
determining a path transmission time (PTT) by combining the first TT and the second TT.

7. The computing system of claim 6, further comprising, comparing a first PTT with a second PTT to determine the maximum transmission time.

8. A computing system for managing mesh network deployment, comprising:
a memory storing machine-executable instructions; and
a processor configured to access the memory and execute the machine-executable instructions to:
receive link performance measurements from a plurality of access points in a mesh network, wherein a subset of the plurality of access points includes one or more access points not part of the mesh network, and wherein the mesh network is defined by the plurality of access points; and
determine a topology of the mesh network by:
determining a node competition index (NCI) for each interfering access point of the plurality of access points in the mesh network;
comparing the NCIs for the interfering access points to determine a maximum transmission time for each mesh link of the mesh network; and
altering the network topology by assigning an active or backup mesh link of the mesh network to each access point of the plurality of access points based on the maximum transmission time for each mesh link of the mesh network.

9. The computing system of claim 8, wherein the link performance measurements include one or more throughput values.

* * * * *